United States Patent [19]

Kaplan

[11] Patent Number: 5,689,557
[45] Date of Patent: Nov. 18, 1997

[54] REDIAL APPARATUS AND METHODS FOR PROCESSING SYMBOLS INPUT BY A USER BEFORE AND DURING A TELEPHONE CALL

[75] Inventor: Diego Kaplan, San Diego, Calif.

[73] Assignee: Qualcomm Incorporated, San Diego, Calif.

[21] Appl. No.: 593,304

[22] Filed: Jan. 31, 1996

[51] Int. Cl.⁶ ........................................ H04M 1/27
[52] U.S. Cl. ............... 379/355; 379/58; 379/63; 379/216; 379/356; 379/209
[58] Field of Search ........................ 379/352, 353, 379/354, 355, 356, 209, 216, 57, 58, 59, 368, 61, 63

[56] References Cited

U.S. PATENT DOCUMENTS

| | | | |
|---|---|---|---|
| 3,943,300 | 3/1976 | Steveson | 379/355 |
| 4,324,954 | 4/1982 | Taylor | 379/355 |
| 4,658,096 | 4/1987 | West, Jr. et al. | 379/59 |
| 4,860,349 | 8/1989 | Brown | 379/356 |
| 4,922,517 | 5/1990 | West, Jr. et al. | 379/58 |
| 5,054,058 | 10/1991 | Kakizawa | 379/157 |
| 5,151,933 | 9/1992 | Abe | 379/159 |
| 5,274,693 | 12/1993 | Waldman | 379/216 |
| 5,363,437 | 11/1994 | Shen et al. | 379/355 |
| 5,394,462 | 2/1995 | Maemura | 379/142 |
| 5,402,481 | 3/1995 | Waldman | 379/368 |
| 5,422,945 | 6/1995 | Wyatt | 379/283 |
| 5,457,692 | 10/1995 | Ishinabe et al. | 370/110.1 |
| 5,491,745 | 2/1996 | Roeder | 379/356 |

*Primary Examiner*—Krista M. Zele
*Assistant Examiner*—Scott Wolinsky
*Attorney, Agent, or Firm*—Russell B. Miller; Brian S. Edmonston

[57] ABSTRACT

A telephone number redial function is provided wherein only digits corresponding to a completed telephone number are stored within a redial buffer. Any digits entered by a user after completion of a telephone number, such as digits entered in response to queries by a voice mail system, are not stored within the redial buffer. As such, digits entered by a user after completion of a telephone number do not affect the telephone number of the redial buffer allowing the telephone number to be properly redialed. In one arrangement, the redial buffer is incorporated within a cellular telephone. Digits entered by a user are first entered within a new number buffer until a send command is received. Thereafter, the digits stored within the new number buffer are transferred to the redial buffer and also transmitted from the cellular phone. Any additional digits entered by the user are transmitted, but not stored within the redial buffer. In an alternative arrangement, the redial buffer is incorporated within a wireless local loop telephone of the type wherein a send button need not be pressed by a user. In yet another arrangement, the redial buffer is incorporated within a telephone connected to a conventional public switched telephone network (PSTN) telephone line. Method and apparatus embodiments are disclosed.

20 Claims, 7 Drawing Sheets

REDIAL APPARATUS AND METHODS FOR PROCESSING SYMBOLS INPUT BY A USER BEFORE AND DURING A TELEPHONE CALL

BACKGROUND OF THE INVENTION

1. Field of the Invention

The invention generally relates to telephone systems and in particular to telephones having a redial capability.

2. Description of Related Art

Telephones commonly provide a redial function whereby a user may, by pressing a single redial button, redial the most recently entered telephone number. Typically, the redial function is implemented by providing a telephone number buffer which stores telephone number digits (or other symbols such as a "#" or "*" symbol) entered by a user while dialing a telephone number. Thereafter, to redial the telephone number, perhaps because a busy signal was received, the user merely presses the single redial button and the contents of the telephone number buffer are transmitted from the telephone. The redial function provides a significant convenience to the user who might otherwise need to repeatedly redial a telephone number, particularly if receiving a repeated busy signal.

Within telephones connected to the public switched telephone network (PSTN), telephone number digits entered by the user are typically stored within a buffer while the digits are simultaneously converted to appropriate dial tones or pulses and transmitted to the PSTN. For cellular phones, digits entered by the user are stored within a similar buffer, then transmitted following activation of a SEND function. For telephones connected to wireless local loop systems, digits entered by the user are stored until the telephone determines that a complete telephone number has been entered, then the digits are transmitted. A wireless local loop system is similar to a cellular telephone system but is configured to emulate a PSTN telephone. In this regard, a dial tone is provided to a user after a handset of the wireless local loop telephone is taken off-hook by the user. The telephone stores digits entered by the user and attempts to determine when the entered telephone number is complete. Once complete, the digits are transmitted to a local base station. Hence, no SEND button needs to be pressed by the user. One technique for determining when a complete telephone number has been entered by the user is to merely wait a predetermined period of time after each digit is entered and, if no additional digit is entered during the time period, the phone number is assumed to be complete and is subsequently transmitted.

For PSTN telephone implementations, if the user takes the telephone off-hook and then presses redial, the previously dialed phone number is automatically redialed. If, however, the user begins to enter a new telephone number, the contents of the telephone number storage buffer are overwritten. Cellular telephones and wireless local loop telephones operate in much the same manner. In each case, the telephone number buffer is of finite length and is typically configured to store the maximum number of digits expected for a telephone number. In the United States, buffers are typically configured to store at least an international long distance telephone number comprised of up to sixteen digits. If any additional digits are entered, then either the most recently entered digits are overwritten or the buffer operates as a shift register causing the newly entered digits to be stored while the earliest entered digits are lost. In still other implementations, a fairly large buffer is provided and, if additional digits are entered, the additional digits are merely appended to previously entered digits up to the maximum buffer size.

Although the conventional redial function offers a considerable convenience to users, problems remain in the manner in which the redial function is implemented. As noted, if additional digits are entered beyond those of the original telephone number, portions of the original telephone number may be overwritten. Hence, if the redial function is thereafter activated, the telephone number may not be dialed correctly resulting either in connection to a wrong telephone number or no connection at all. Such is a common problem when a user calls a voice mail system and enters digits to the voice mail system in response to queries therefrom. The voice mail digits are then appended to, or overwrite, digits of the original telephone number in the telephone number buffer. If the buffer is implemented as a shift register, then each digit entered for controlling a voice mail system may cause one digit from the original telephone number to be lost thereby preventing the original telephone number from being properly redialed. If implemented to replace only the last entered digit, then the last digit of the telephone number will be replaced with a new digit causing the redial function to dial an incorrect telephone number. If implemented with a buffer sufficient to allow appending of additional digits, then the redial number will be redialed with both the telephone number and additional appended digits which, depending upon the telephone system, may result in an error or may cause the telephone number to be correctly dialed while simultaneously inputting all of the same digits to the voice mail system connected thereto which, typically, is not what the user wants or expects.

In view of the foregoing, it can be appreciated that there is a need to implement a redial function in a manner which allows the originally dialed telephone number to be preserved even if additional digits are entered and which allows the number to be redialed without also redialing any of the subsequently entered digits. It is to that end that aspects of the present invention are drawn.

SUMMARY OF THE INVENTION

In accordance with the invention, a redial function for a telephone is implemented by providing a telephone number buffer and a separate redial buffer. All digits entered by a user, including telephone number digits, voice mail responsive digits or other digits, are stored in the telephone buffer. However, only telephone number digits are stored within the redial buffer. Hence, during redial, only the digits of the previously dialed telephone number are redialed. Other digits, including voice mail responsive digits entered by the user, are not redialed. Thus, digits entered by a user after a telephone number has been entered do not affect the telephone number stored within the redial buffer.

In one implementation, digits corresponding to an entered telephone number are transferred to the redial buffer only after the telephone number is complete. Within a cellular telephone implementation, the telephone number is transferred to the redial buffer when the user presses a SEND button. For wireless local loop telephone systems, the telephone number is transferred to the redial buffer only after the telephone determines that the telephone number is complete and transmits the telephone number. The determination of whether the telephone number is complete may be performed in accordance with conventional techniques such as waiting a predetermined period of time after entry of each digit and assuming that the telephone number is complete if a new digit is not entered within the predetermined period of time. For implementation within a telephone connected to a PSTN, the telephone number is also transferred to the redial buffer after the telephone number is determined to be complete. Such a determination can be performed in much the same manner as with telephones connected to wireless local loop systems.

By storing only digits corresponding to a completed telephone number within the redial buffer, the telephone number can thereafter be properly redialed even though other digits may have been entered after completion of a telephone number including, for example, digits entered responsive to queries from voice mail systems and the like. Depending upon the implementation, the redial buffer may additionally store other symbols such as a "#" symbol or a "*" symbol. Accordingly, the general objective set forth above is achieved. Other objects, features and advantages of the invention will be apparent from the detailed description which follows and from the accompanying drawings.

DETAILED DESCRIPTION OF EXEMPLARY EMBODIMENTS OF THE INVENTION

With reference to the remaining figures, exemplary embodiments of the invention will now be described. The exemplary embodiments are described primarily with reference to block diagrams and flowcharts. As to the flowcharts, each block within the flowcharts represents both the method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof. As to the block diagrams, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

The improved redial function of the invention will be described primarily with reference to a cellular telephone embodiment illustrated in FIGS. 1-3. Implementations of the redial function appropriate for use within a wireless local loop telephone or a PSTN telephone will be described with reference to the remaining figures.

Figure 1:
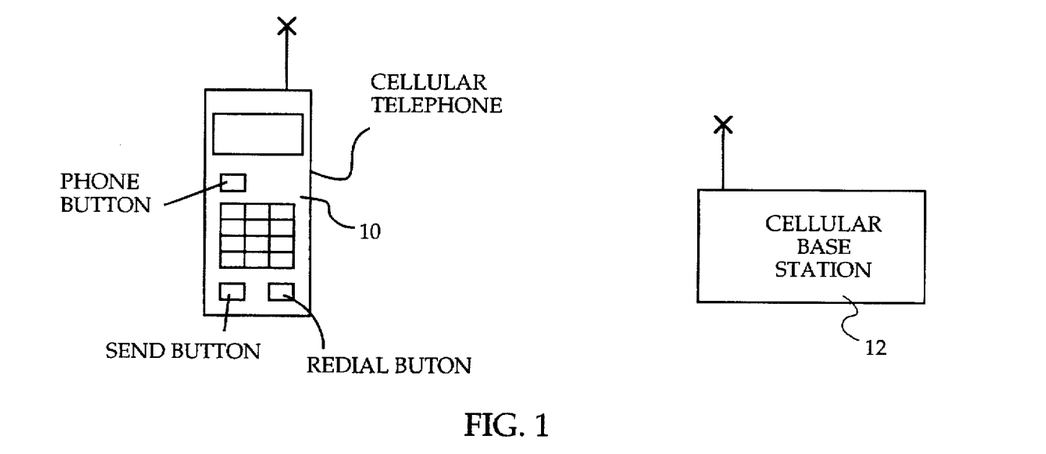
FIG. 1 is a block diagram of a cellular telephone system including a cellular telephone configured with a redial function in accordance with the invention.

FIG. 1 illustrates a cellular telephone 10 and a cellular telephone base station 12. In accordance with conventional techniques, cellular telephone 10 transmits signals to, and receives signals from, base station 12. Any of a variety of cellular telephone transmission techniques may be employed including frequency domain multiple access (FDMA), time domain multiple access (TDMA) and code division multiple access (CDMA). Although not separately shown in FIG. 1, the cellular base station may be interconnected to other base stations forming a cellular telephone system to allow telephone calls to be connected to other cellular telephones and to a PSTN system to allow telephone calls to be connected to conventional telephones.

In accordance with conventional techniques, a telephone call is initiated by a user by pressing an activation button, such as a PHONE button on the cellular phone, then entering a telephone number to be dialed using a numeric keypad. Once the telephone number has been entered, the user presses a SEND button triggering transmission of the complete telephone number to the cellular base station. Thereafter, the user may press additional digits on the numeric keypad to, for example, respond to queries initiated by a voice mail telephone system (not shown) accessed by the dialed telephone number. As will be described with reference to FIGS. 2 and 3, the cellular telephone includes a redial capability configured to store and redial only numbers entered by the user prior to triggering the SEND function such that a completed telephone number, absent any additional digits, can be redialed.

Figure 2:
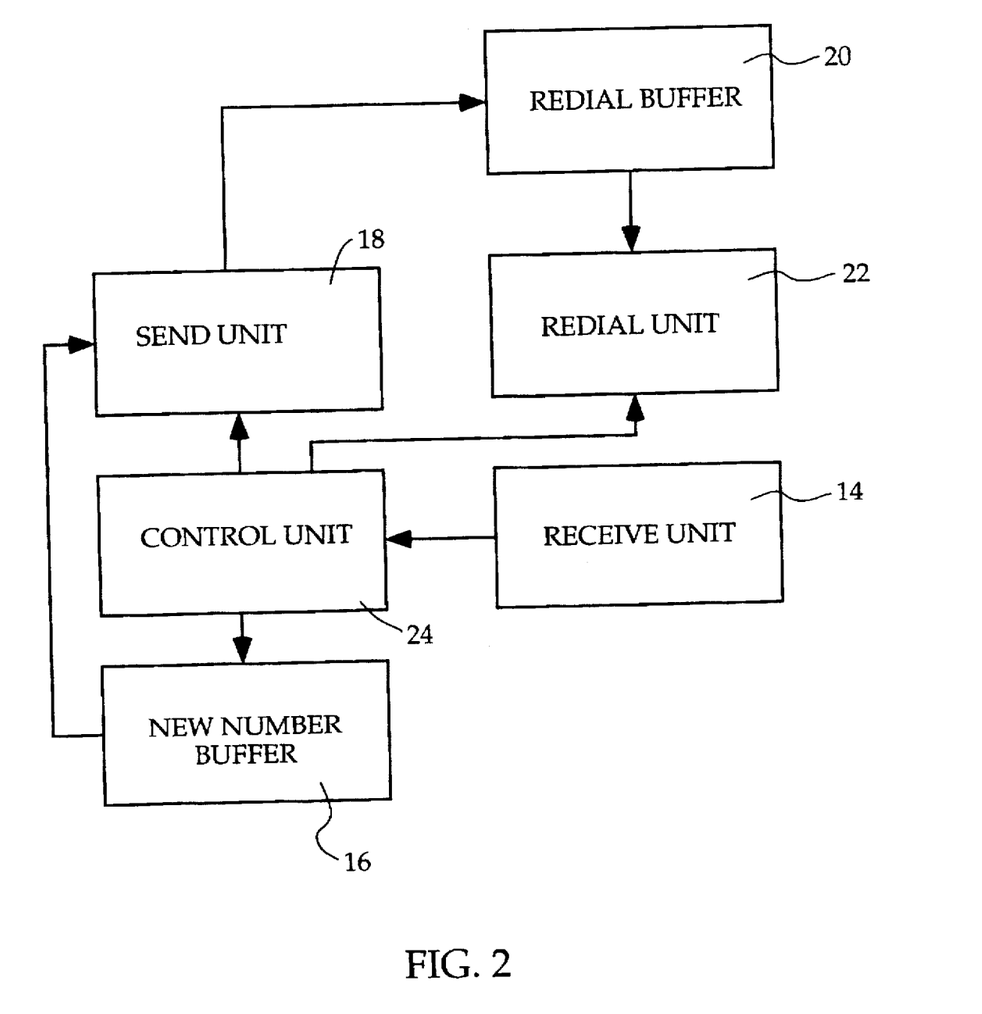
FIG. 2 is a block diagram of internal components of the cellular telephone of FIG. 1.

FIG. 2 illustrates pertinent components of the cellular telephone of FIG. 1. More specifically, FIG. 2 illustrates a receive unit 14 for receiving digits and command signals (such as send or redial signals) entered by a user, a new number buffer 16 for storing all received digits and a send unit 18 for sending or transmitting all digits within buffer 16 to the nearest cellular base station (FIG. 1) for use in initiating a telephone call. The cellular telephone also includes a separate redial buffer 18 for storing all numbers contained within a number buffer 16 at the time the send unit is activated. A redial unit 22 accesses the redial buffer in response to reception of a REDIAL signal to resend the telephone number contained within the redial buffer. All of the aforementioned units are controlled by a control unit 24.

In use, control unit 24 is activated by reception of an activation signal such as a PHONE signal received from receive unit 14. Control unit 24 stores digits received thereafter into the new number buffer until a SEND command is received at which time the control unit triggers send unit 18 to transmit all digits of the telephone number contained within the new number buffer, thereby initiating a telephone call.

Eventually the telephone call is terminated, perhaps upon completion of the telephone call or following reception of a busy signal indication. Thereafter, the previously entered telephone number may be redialed as follows. First, control unit 24 receives the PHONE or other telephone activation signal. If the controller thereafter initially receives a REDIAL signal, then a controller activates redial unit 22 to transfer the telephone numbers stored within the redial buffer to send unit 18 for transmission therefrom. As noted, the redial buffer contains only those digits entered by the user prior to originally entering the send function and does not include any digits subsequently entered. If, on the other hand, control unit 24 initially receives a digit or other symbol such as a "#" or "*" symbol, rather than a REDIAL command, following the activation signal, then the controller unit clears the new number buffer and enters the new digit into the new number buffer. Depending upon the implementation, the controller unit may also control the redial unit to clear the contents of the redial buffer. In other implementations, the previous contents of the redial buffer may be retained such that the previous number may be redialed even after several digits of a new telephone number had been entered into the new number buffer. Also, depending upon the implementation, the redial buffer may additionally store other symbols besides digits such as the "#" symbol and the "*" symbol. For clarity in describing the principles of the invention, in the following it will be assumed that only digits are stored within the redial buffer.

Figure 3:
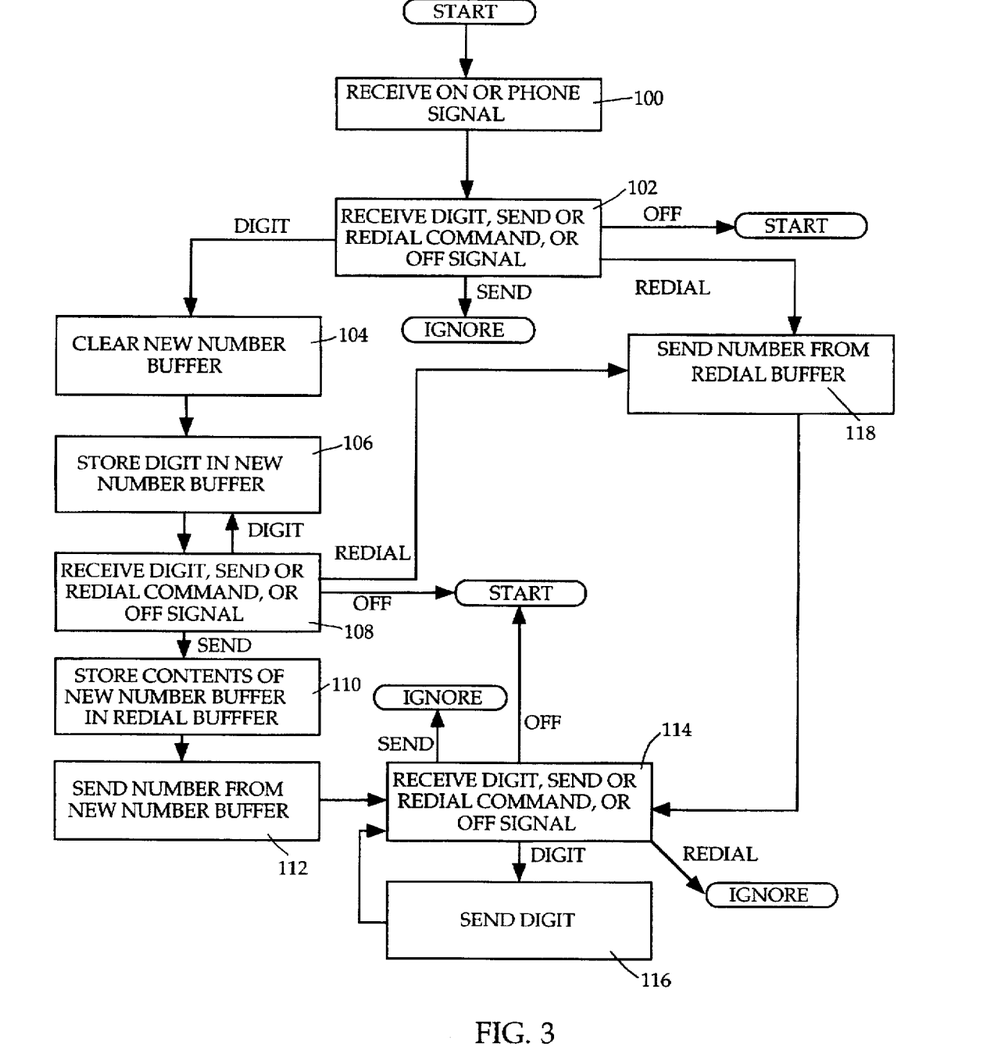
FIG. 3 is a flowchart illustrating a method for dialing and redialing telephone numbers performed by the cellular telephone of FIGS. 1 and 2.

The foregoing method for dialing and redialing the numbers is set forth in detail in the flowchart of FIG. 3. Initially, a PHONE signal or other activation signal is received, step 100. Thereafter, depending upon the user input, the cellular telephone receives either a digit, a SEND or REDIAL command, or an OFF signal or other similar deactivation signal, step 102. Assuming that a digit is received, execution proceeds to step 104 wherein the new number buffer is cleared and step 106 wherein the newly received digit is stored in the cleared new number buffer. Thereafter, at step 108, the phone again receives either a digit, a SEND or REDIAL command, or an OFF signal. If a second digit is received, then execution returns to step 106 where the second digit is appended to the first digit within the new number buffer. Typically, steps 106 and 108 proceed in a loop until all digits of a telephone number to be dialed are entered and a SEND signal is received. Upon reception of the SEND command, execution proceeds to step 110 where the contents of the new number buffer are stored within the redial buffer. Then, at step 112, the number within the new number buffer is transmitted to the local cellular telephone base station. Steps 110 and 112 may be performed in opposite order. In either case, execution proceeds to step 114 where the telephone again receives either a digit, a SEND or REDIAL command, or an OFF command. If additional digits are received, perhaps in response to queries from a voice mail system accessed by the telephone number previously transmitted, the digits are transmitted, one at a time, step 116. Typically, the telephone call is terminated by reception of an OFF signal and execution returns to the START.

Thereafter, a second telephone call may be initiated by reception of a PHONE signal, step 100, and a digit, SEND or REDIAL command or off command, step 102. If, a digit is received, execution proceeds to step 104 as before and the digits of the new telephone number are entered. If, however, the REDIAL command is received prior to receipt of a digit, then execution proceeds to step 118 where the number stored within the redial buffer is transmitted, thereby redialing the previous telephone number. Once the number is redialed, execution returns to step 114 and, if additional digits are received, those digits are transmitted one at a time, step 116. Ultimately, the telephone call is terminated at step 114 by reception of an OFF signal. Thereafter, the telephone number can be again redialed by reception of a REDIAL command at step 102 or a new number may be entered by reception of a digit at step 102.

The OFF signal can be received at any time. Accordingly, as illustrated in FIG. 3, if an OFF signal is detected at steps 102, 108 or 114, execution immediately returns to START.

Likewise, the SEND command can be received at any time. In the exemplary implementation of FIG. 3, if the SEND command is detected at step 102 or 114, the SEND command is merely ignored. A send command is processed only if detected at step 110 after entry of digits corresponding to a new telephone number. In other implementations, it may desirable to allow the SEND command to be entered and processed and other times as well. For example, in one implementation, SEND commands are employed during the telephone calls to perform FLASH operations to, for example, respond to or initiate call-waiting. Also, it may desirable to allow the SEND command to be invoked during a telephone call to facilitate establishing a conference call. If so, any telephone numbers entered and sent during a telephone call may, depending upon the implementation, be ignored for redial purposes. In other words, any such additional telephone numbers need not be stored within the redial buffer. However, in the other implementations, the most recently entered and transmitted telephone number may be copied into the redial buffer. As can be appreciated, a wide range of implementations may be provided consistent with the principles of the invention. In the exemplary implementation of FIG. 3, the SEND command is simply ignored if received during a telephone call. Likewise, the REDIAL command can be received at any time. If received and processed at step 102, the REDIAL command triggers activation of the REDIAL function (step 118). If received and processed at step 114, the REDIAL command is merely ignored. In other words, once a telephone number has been transmitted and a telephone call thereby initiated, pressing of the REDIAL button is simply ignored. If, the REDIAL command is received and processed at step 108, however, then any digits previously entered are discarded and the last stored complete phone number is redialed (step 118). Hence, with this implementation, a user may begin entering a new telephone number then abort the new telephone number and instead redial the previous telephone number. In other implementations, the cellular telephone may be configured to simply ignore any REDIAL commands received at step 108 thereby requiring the user to first terminate the current telephone call, by pressing the OFF button or similar on-hook indication button, then initiating a new telephone call by pressing the PHONE button, and finally pressing the REDIAL button.

Thus, FIG. 3 illustrates one method for processing telephone numbers using the cellular telephone of FIGS. 1 and 2 wherein a separate redial buffer is provided. However, the cellular telephone may be operated in accordance with other methods. Likewise, the method set forth in FIG. 3 may be performed using cellular telephones configured other than is specifically shown in FIGS. 1 and 2. In general, a wide range of methods and apparatus may be implemented consistent with the general principles of the invention wherein a redial function is implemented to redial only those digits entered by the user prior to entry of a SEND command such that any digits entered after the send command are not also redialed.

What has been described thus far is a cellular telephone having a redial buffer configured to store only digits entered prior to receipt of a SEND signal. The redial buffer of the invention is particularly well suited for use in cellular telephones because the user provides a definitive signal (the SEND signal) indicating completion of the telephone number to be dialed. In the following, a similar redial buffer is implemented within telephones connected to wireless local loop systems and PSTN systems wherein the user is not required to press a SEND button upon completion of entry of a telephone number. Hence, additional circuitry or other logic is required within the telephone to detect completion of the telephone call to trigger activation of the redial buffer.

Figure 4:
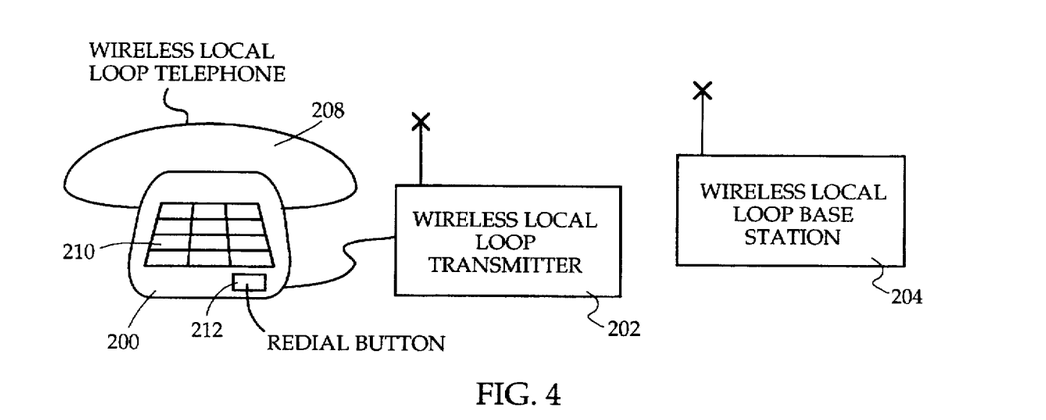
FIG. 4 is a block diagram of a wireless local loop telephone system incorporating a telephone having a redial function similar to that of the embodiment of FIGS. 1-3.

FIG. 4 illustrates a telephone 200 connected to a local wireless local loop transmitter 202 which transmits signals to, and receives signals from, a wireless local loop base station 204 which, although not shown, may be connected to a PSTN system 206. In use, a user takes a handset portion 208 of telephone 200 off-hook to initiate a telephone call. Hence, unlike a cellular telephone, no PHONE button or other activation button needs to be pushed to initiate a telephone call. Also, unlike a cellular telephone, an artificial dial tone is provided through handset 208 to emulate a PSTN system. The dial tone is deactivated as soon as the user enters a digit from a keypad 210 or presses a REDIAL button 212. If a digit is entered, the telephone stores the digit within a new number telephone buffer until the telephone determines that the entered telephone number is complete. Thereafter, the telephone transmits the complete telephone number to local transmitter 202 which, in turn, transmits the telephone number to the base station 204 for subsequent processing including, for example, transmission to a PSTN. Transmission between local station 202 and base station 204 may be performed in accordance with the variety of conventional cellular technology transmission protocols including the aforementioned FDMA, TDMA and CDMA techniques. Ultimately, the telephone call is terminated by placing the handset 208 on-hook. Thereafter, if the handset is taken off-hook and the REDIAL button 212 is pressed, the number stored within the redial buffer is automatically redialed, i.e., the number is forwarded to the local transmitter 202 for transmission to base station 204.

Figure 5:
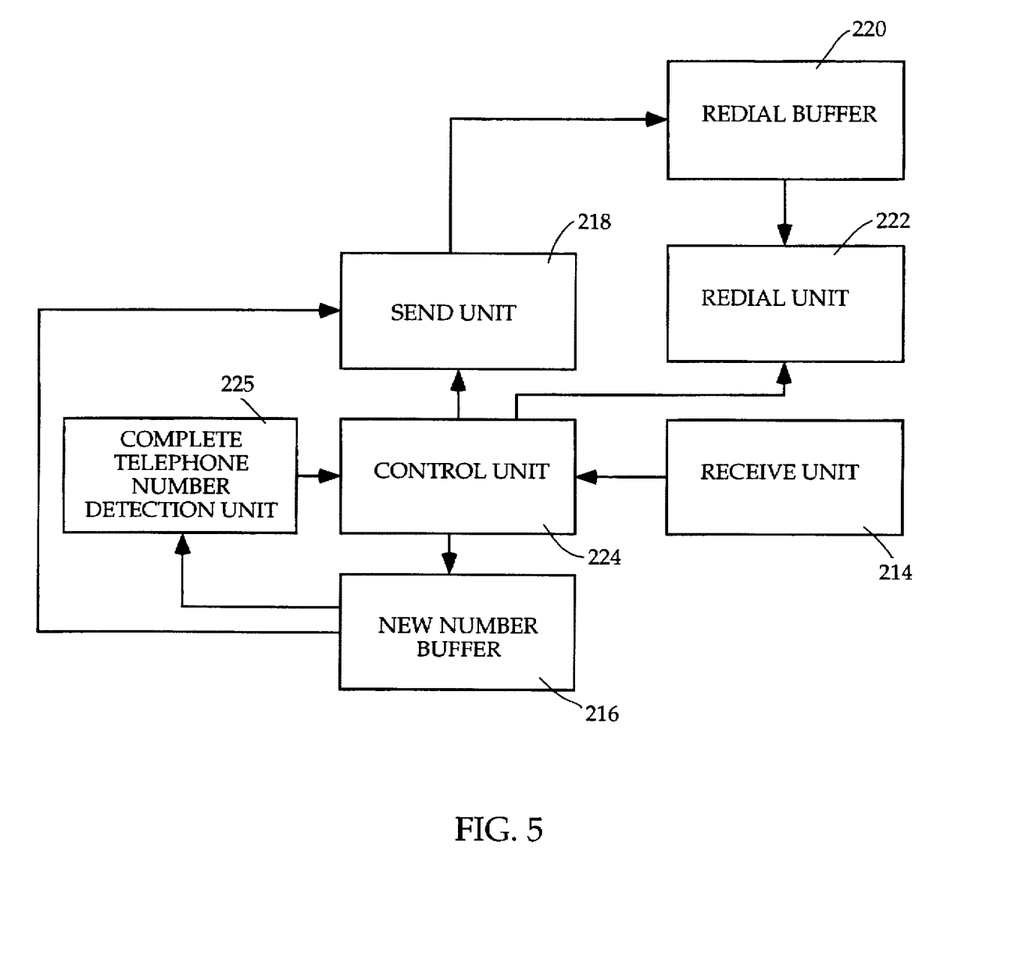
FIG. 5 is a block diagram of internal components of the wireless local loop telephone of FIG. 4.

FIG. 5 illustrates pertinent components of the telephone of FIG. 4. Most components are similar to those of the embodiment of FIG. 2 (with like components having like reference numerals incremented by 200) and will not be redescribed. Additionally, however, the telephone of FIG. 5 includes a complete telephone number detection unit 225 which receives digits entered by the user and determines whether a complete telephone number has been entered. Detection unit 225 may operate in accordance with conventional techniques by activating a timer following reception of each entered digit. If no additional digits are received within a predetermined time out period, it is assumed that a complete number has been entered. For example, if three or four seconds pass following entry of a previous digit, the detection unit can typically safely assume that the user has completed entering the telephone number. Other techniques for detecting completion of the telephone number may alternatively be employed.

Once the complete number has been detected, the detection unit transmits the signal to controller 224 which, as with the embodiment of FIG. 2, triggers the send unit to send the telephone number stored within the new number buffer and triggers the redial unit to store a copy of the number from the new number buffer into the redial buffer for subsequent use. Thereafter, if the telephone handset is taken off-hook and the REDIAL button pressed, the controller 224 triggers redial unit 222 to redial the telephone number stored within the redial buffer. Assuming that the complete number detection unit correctly detected the reception of the last digit of a complete telephone number, then the completed telephone number is thereby redialed. If the complete number detection is incorrect, perhaps because the user entered several addition of digits beyond that of a complete telephone number within the predetermined period of time, then the number stored within the redial buffer may include more digits than a completed telephone number and therefore may not allow a correct redial. Of course, in that case, the telephone number originally dialed would also have included the extra digits and therefore may not have dialed properly either.

Figure 6:
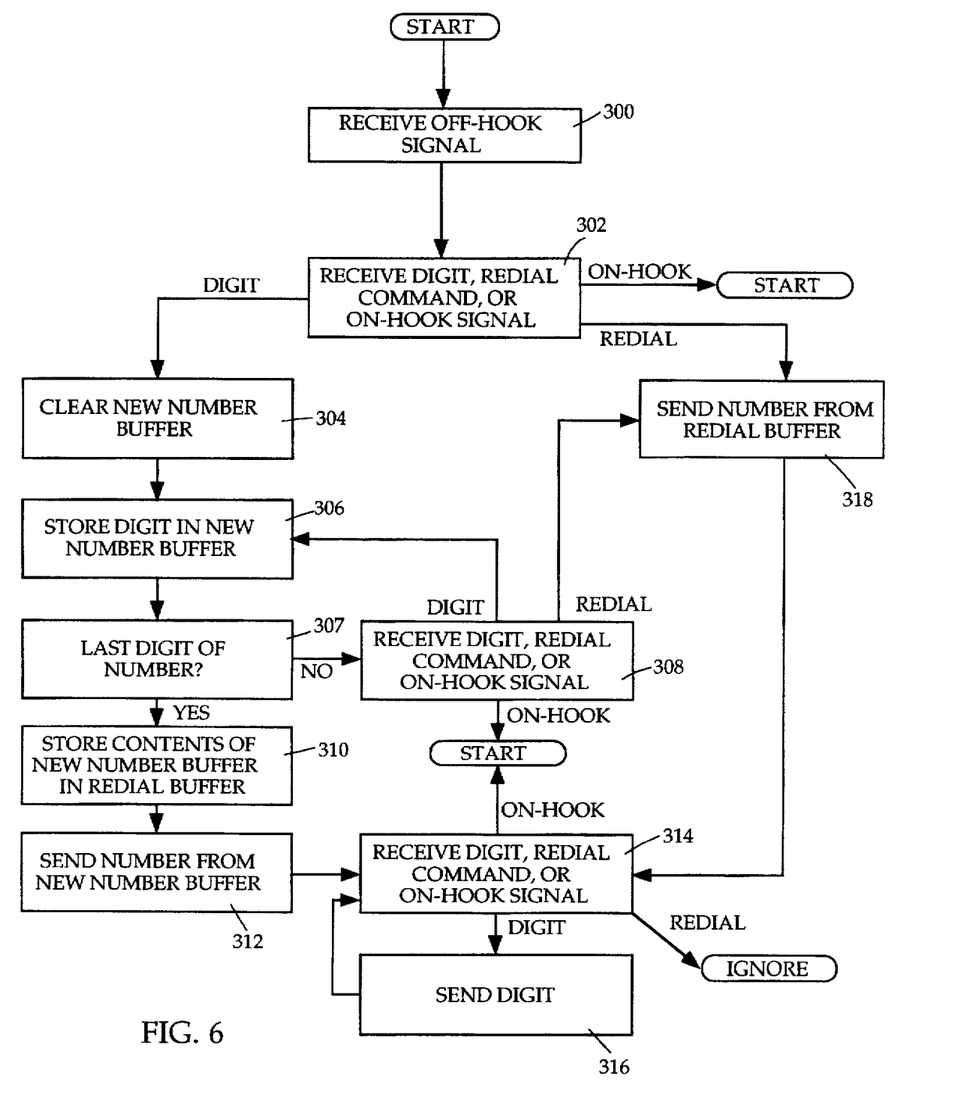
FIG. 6 is a flowchart illustrating a redial method performed by the telephone of FIG. 4 and 5.

FIG. 6 sets forth the method summarized above. The method of FIG. 6 is similar to that of FIG. 3 (with like steps having like reference numerals incremented by 200) and only pertinent differences will be described. At steps 302, 308 and 314, the wireless local loop telephone receives either a digit, a REDIAL command or an ON-HOOK signal. The wireless local loop telephone does not incorporate a SEND button. Hence, no SEND signal is received. In the arrangement of FIG. 3, digits are entered in a loop at steps 106 and 108 until a SEND signal is received, or a REDIAL or OFF signal is received. In the arrangement of FIG. 6, however, digits are entered in a loop including steps 306, 307 and 308 until the last digit of a completed telephone number is detected at step 307 or a REDIAL or ON-HOOK signal is received at step 308. If, at step 307, the last digit of the completed telephone number is detected, execution proceeds to step 310 where the telephone stores the contents of the new number buffer and the redial buffer then transmits the telephone number from the new number buffer: After a telephone number has been transmitted, and the telephone is ultimately placed on-hook then taken off-hook again, subsequent reception of a REDIAL command (prior to entry of a digit) triggers a redial of the number stored within the redial buffer (step 318).

Thus, the wireless local loop arrangement operates in much the same manner as the cellular telephone arrangement but no SEND signal is required. Rather, the wireless local loop telephone includes a unit for detecting completion of a telephone number thereby triggering transmission of the telephone number and storage of the telephone number into the separate redial buffer. The following provides an arrangement wherein the redial function of the invention is implemented within a telephone connected to a PSTN.

Figure 7:
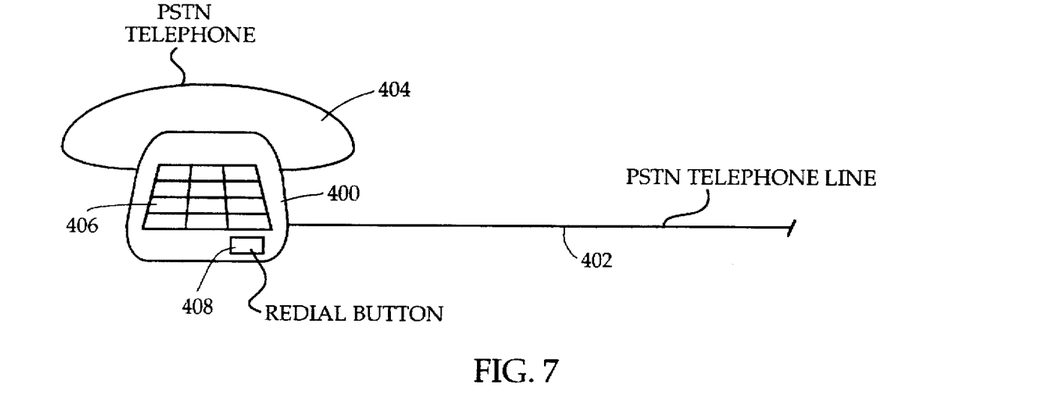
FIG. 7 is a block diagram illustrating a telephone connected to a PSTN.

FIG. 7 illustrates a telephone 400 connected to a PSTN telephone line 402. The telephone includes a handset 404 and a body having a numeric keypad 406 and a REDIAL button 408. In use, the handset is taken off-hook and telephone number digits entered via keypad 406 are transmitted over the PSTN line using either pulses or tones. Unlike the cellular telephone and wireless local loop telephone systems described above, wherein a telephone number is transmitted only after it is complete, the PSTN telephone of FIG. 7 transmits individual telephone number digits over the PSTN line as the digits are entered via keypad. Nevertheless, telephone 400 also includes a circuit or other logic for detecting completion of the telephone number to allow the complete telephone number, and only the telephone number, to be stored within a redial buffer. Thereafter, if the telephone handset 404 is placed on-hook, then taken off-hook, and the REDIAL button is pressed, telephone 400 redials the number stored within the redial buffer. As such, any digits entered by the user after completion of the original telephone number, and before placing the handset on-hook, are not stored within the redial buffer and are not redialed. The circuit or other logic for detecting completion of the telephone number may be the same as the corresponding circuit or logic of the wireless local loop embodiment described above. For example, telephone 400 may activate a timer after reception of each new digit and determine that a complete phone number has been entered if no digit is received within a predetermined period. In any case, all digits received prior to detection of a complete telephone number are stored within the redial buffer (not separately shown in FIG. 7) and any digits entered thereafter, perhaps in response to queries from a voice mail system, are not stored within the redial buffer, thereby allowing the complete telephone number, and only the complete telephone number, to be redialed.

Figure 8:
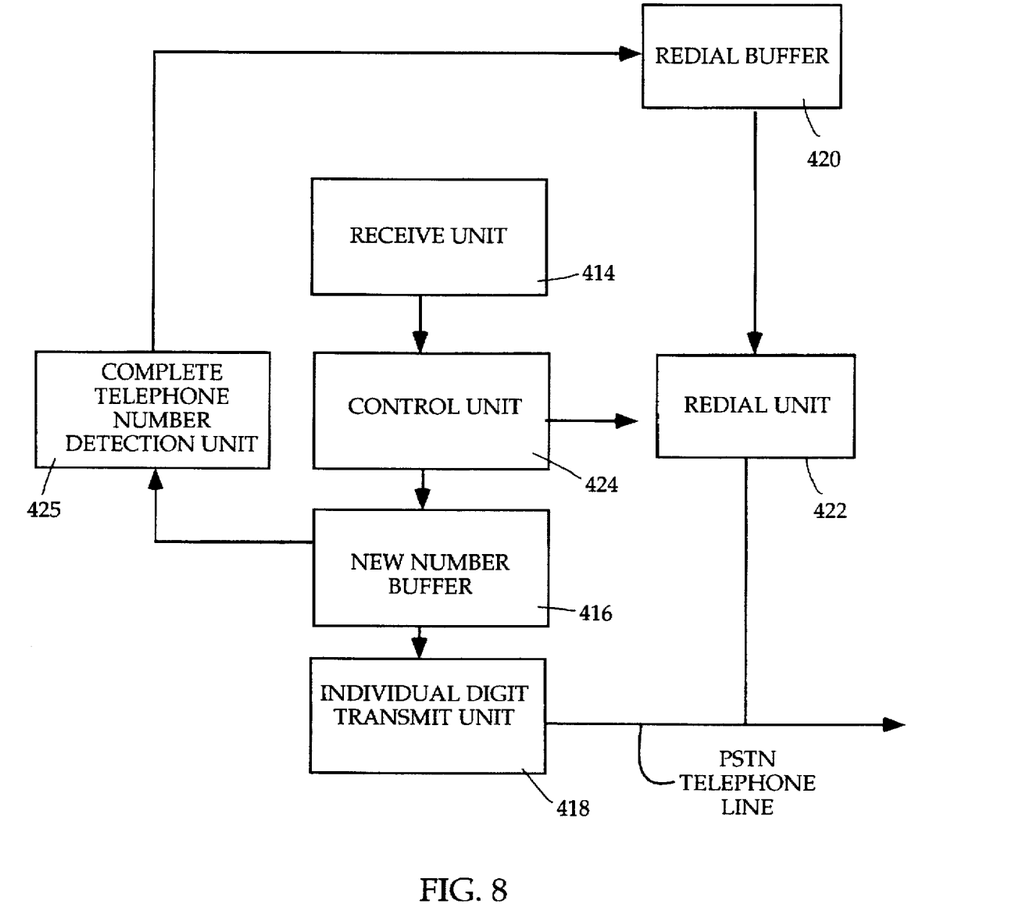
FIG. 8 is a block diagram of internal components of the telephone of FIG. 7.

FIG. 8 illustrates pertinent components of the telephone of FIG. 7. Most components are similar to those of the embodiment of FIG. 5 and will not be redescribed. Only pertinent differences will be noted. Rather than having a send unit which sends all digits of a completed telephone number, the arrangement of FIG. 8 includes a transmit unit which transmits each individual digit as it is entered onto the PSTN line either pulses or tones. The digits are simultaneously stored within the new number buffer and the complete telephone detection unit examines digits stored within the new number buffer to determine when the telephone number is completed.

Figure 9:
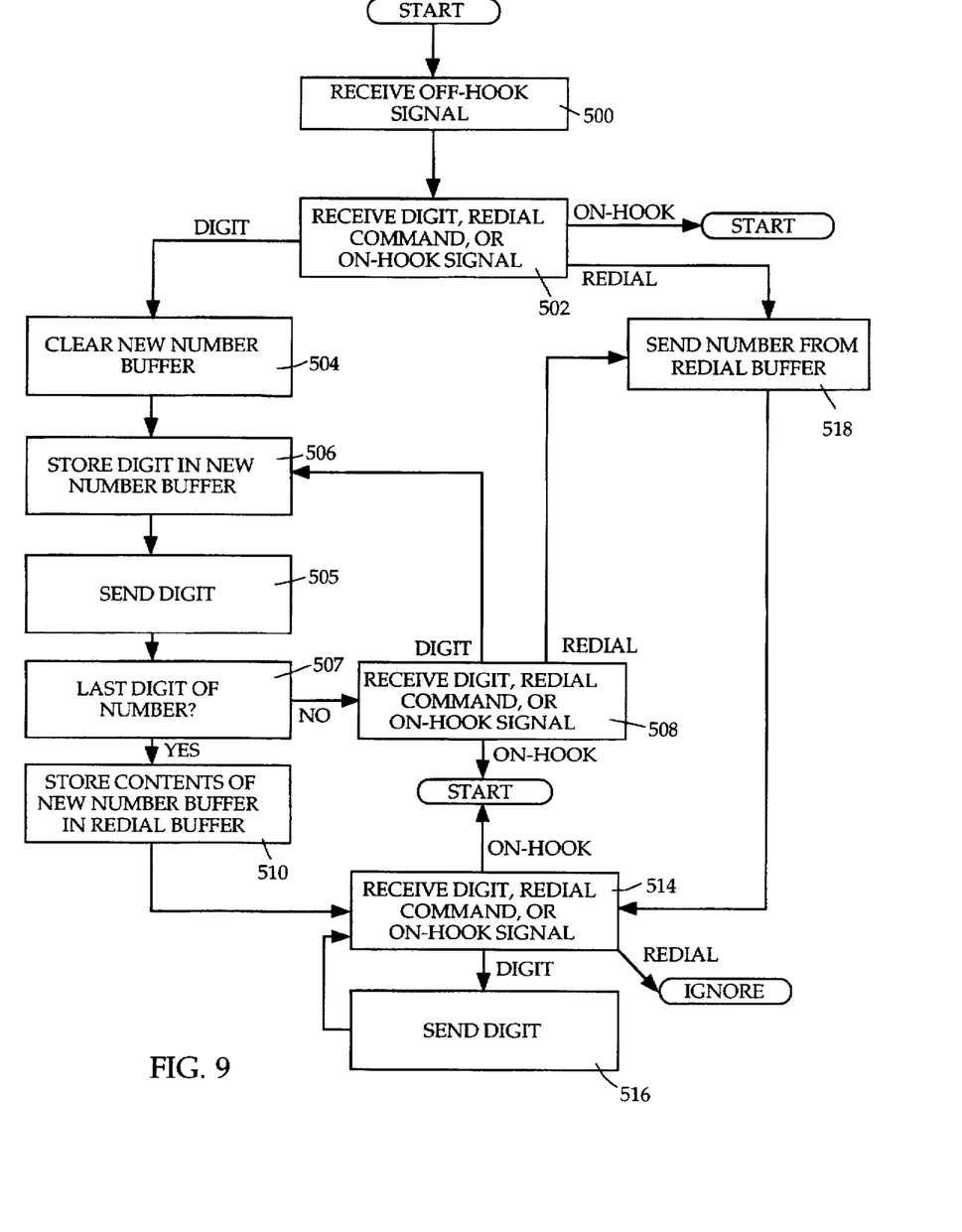
FIG. 9 is a flowchart illustrating a redial method performed by the telephone of FIG. 6.

FIG. 9 provides a flow chart summarizing the method of operation of the telephone of FIGS. 7 and 8. The method of FIG. 9 is similar to the methods of FIGS. 3 and 6 and only pertinent differences will be described. Within FIG. 9, rather than deferring transmission of digits until a completed telephone number has been entered, each individual digit is transmitted, step 505, onto the PSTN telephone line as the digits are received by the telephone. Hence, no separate send number step (such as step 112 of FIG. 3) is provided. Otherwise, operation proceeds in a similar manner to that of the wireless local loop telephone method of FIG. 5.

What has been described are various methods for implementing an improved redial capability within cellular telephones, wireless local loop telephones, and PSTN telephones. In each case, only digits corresponding to a complete telephone number are stored within a redial buffer. Any digits entered thereafter do not affect the number stored within the redial buffer such that the completed telephone number, and only the completed telephone number, can be subsequently redialed. Digits entered after completion of a telephone number are ignored for the purposes of the REDIAL function but are transmitted by the telephone to allow access to, for example, voice mail systems and the like. Although not shown in the accompanying figures, the invention may also be exploited within telephones connected to local PBX systems. In such an embodiment, the redial function may be configured in much the same manner as the PSTN telephone of FIGS. 7-9, except that digits transmitted by the telephone are transmitted to a local PBX rather than directly on to a PSTN line. Principals of the invention may be exploited within other systems as well. In general, the embodiments described herein are provided merely to illustrate the invention and should not be construed as limiting the scope of the invention.

What is claimed is:

1. A method for processing commands and symbols input by a user to a mobile telephone, with said commands being input to control the operation of the telephone, and with said symbols being input for transmission by the mobile telephone to initiate a telephone call by identifying a telephone number to be connected to or for transmission by the mobile telephone during the telephone call, said mobile telephone having a new number buffer for storing selected symbols and a redial buffer for storing selected symbols, said method comprising the steps of:

a) receiving either a redial command or a symbol input by the user;

b) if a redial command was received at step a), then transmitting the contents, if any, of the redial buffer to identify a telephone number to be connected to; and c) if a symbol was received at step a), then c.1) clearing the new number buffer, c.2) storing the symbol received at step a) in the new number buffer, c.3) receiving either a send command, a redial command or another symbol input by the user, c.4) if a redial command was received at step c.3), then transmitting the contents, if any, of the redial buffer to identify a telephone number to be connected to, c.5) if another symbol was received at step c.3), then storing the symbol received at step c.3) in the new number buffer and repeating step c.3), and c.6) if a send command was received at step c.3), c.6.a) storing the current contents of the new number buffer in the redial buffer, c.6.b) transmitting the contents of the new number buffer to identify the telephone number to be connected to, c.6.c) receiving another symbol input by the user, and c.6.d) transmitting without storing the symbol received at step c.6.c) and repeating steps c.6.c) and c.6.d) until the telephone call is terminated.

2. The method of claim 1 wherein at step a), the mobile telephone alternatively receives an off command and wherein the mobile telephone, in response thereto, terminates operation.

3. The method of claim 1 wherein at step a), the mobile telephone alternatively receives a send command and wherein the mobile telephone ignores the send command.

4. The method of claim 1 wherein at step c.3), the mobile telephone alternatively receives an off command and wherein the mobile telephone, in response thereto, terminates operation.

5. The method of claim 1 wherein at step c.6.c), the mobile telephone alternatively receives an off command and wherein the mobile telephone, in response thereto, terminates operation.

6. The method of claim 1 wherein at step c.6.c), the mobile telephone alternatively receives a send command and wherein the mobile telephone ignores the send command.

7. The method of claim 1 wherein at step c.6.c), the mobile telephone alternatively receives a redial command and wherein the mobile telephone ignores the redial command.

8. The method of claim 1 wherein upon completion of transmission of the contents of the redial buffer at step b) the method continues with step c.6.c) and wherein upon completion of transmission of the contents of the redial buffer of step c.4) the method continues with step c.6.c).

9. A method for processing commands and symbols input by a user to a wireless local loop telephone, with said commands being input to control the operation of the telephone, and with said symbols being input for transmission by the wireless local loop telephone to initiate a telephone call by identifying a telephone number to be connected to or for transmission by the wireless local loop telephone during the telephone call, said wireless local loop telephone having a new number buffer for storing selected symbols and a redial buffer for storing selected symbols, said method comprising the steps of:

a) receiving either a redial command or a symbol input by the user;

b) if a redial command was received at step a), then transmitting the contents, if any, of the redial buffer to identify a telephone number to be connected to; and c) if a symbol was received at step a), then c.1) clearing the new number buffer, c.2) storing the most recently received symbol in the new number buffer, c.3) determining whether the most recently received symbol was the last symbol of the telephone number to be connected to, c.4) if the most recently received symbol of step c.3) was not the last symbol of the telephone number to be connected to, then     c.4.a) receiving either a redial command or another symbol input by the user;

c.4.b) if a redial command was received at step c.4.a), then transmitting the contents, if any, of the redial buffer to identify a telephone number to be connected to, and     c.4.c) if another symbol was received at step c.4.a), then storing the symbol received at step c.4.a) in the new number buffer and repeating step c.3), and c.5) if the most recently received symbol of step c.3) was the last symbol of the telephone number to be connected to, then     c.5.a) storing the current contents of the new number buffer in the redial buffer,     c.5.b) transmitting the contents of the new number buffer to identify the telephone number to be connected to,     c.5.c) receiving another symbol input by the user,     c.5.d) transmitting without storing the symbol received at step c.5.c) and repeating steps c.5.c) and c.5.d) until the telephone call is terminated.

10. The method of claim 9 wherein at step a), the wireless local loop telephone alternatively receives an on-hook command and wherein the wireless local loop telephone, in response thereto, terminates operation.

11. The method of claim 9 wherein at step c.4.a), the wireless local loop telephone alternatively receives an on-hook command and wherein the wireless local loop telephone, in response thereto, terminates operation.

12. The method of claim 9 wherein at step c.5.c), the wireless local loop telephone alternatively receives an on-hook command and wherein the wireless local loop telephone, in response thereto, terminates operation.

13. The method of claim 9 wherein at step c.5.c), the wireless local loop telephone alternatively receives a redial command and wherein the wireless local loop telephone ignores the redial command.

14. The method of claim 9 wherein upon completion of transmission of the contents of the redial buffer at step b) the method continues with step c.5.c) and wherein upon completion of transmission of the contents of the redial buffer of step c.4.b) the method continues with step c.5.c).

15. A method for processing commands and symbols input by a user to a telephone connected to a public switched telephone network, with said commands being input to control the operation of the telephone, and with said symbols being input for transmission by the telephone to initiate a telephone call by identifying a telephone number to be connected to or for transmission by the telephone during the telephone call, said telephone having a new number buffer for storing selected symbols and a redial buffer for storing selected symbols, said method comprising the steps of:

a) receiving either a redial command or a symbol input by the user;

b) if a redial command was received at step a), then transmitting the contents, if any, of the redial buffer to identify a telephone number to be connected to; and c) if a symbol was received at step a), then     c.1) clearing the new number buffer,     c.2) storing the most recently received symbol in the new number buffer,     c.3) transmitting the most recently received symbol,     c.4) determining whether the most recently received symbol was the last symbol of the telephone number to be connected to,     c.5) if the most recently received symbol of step c.4) was not the last symbol of the telephone number to be connected to, then receiving either a redial command or another symbol input by the user, then         c.5.a) receiving either a redial command or another symbol input by the user;

c.5.b) if a redial command was received at step c.5.a), then transmitting the contents, if any, of the redial buffer to identify a telephone number to be connected to; and         c.5.c) if another symbol was received at step c.5.a), then storing the symbol received at step c.5.a) then repeating step c.3), and     c.6) if the most recently received symbol was the last symbol of the telephone number to be connected to, then         c.6.a) storing the current contents of the new number buffer in the redial buffer,         c.6.b) receiving another symbol input by the user,         c.6.c) transmitting without storing the symbol received at step c.6.b) and repeating steps c.6.b) and c.6.c) until the telephone call is terminated.

16. The method of claim 15 wherein at step a), the telephone alternatively receives an on-hook command and wherein the telephone, in response thereto, terminates operation.

17. The method of claim 15 wherein at step c.5.a), the telephone alternatively receives an on-hook command and wherein the telephone, in response thereto, terminates operation.

18. The method of claim 15 wherein at step c.6.b), the telephone alternatively receives an on-hook command and wherein the telephone, in response thereto, terminates operation.

19. The method of claim 15 wherein at step c.6.b), the telephone alternatively receives a redial command and wherein the telephone ignores the redial command.

20. The method of claim 15 wherein upon completion of transmission of the contents of the redial buffer at step b) the method continues with step c.6.b) and wherein upon completion of transmission of the contents of the redial buffer of step c.5.b) the method continues with step c.6.b).

* * * * *

UNITED STATES PATENT AND TRADEMARK OFFICE
CERTIFICATE OF CORRECTION

PATENT NO. : 5,689,557
DATED : November 18, 1997
INVENTOR(S) : Kaplan

It is certified that error appears in the above-identified patent and that said Letters Patent is hereby corrected as shown below:

Col. 3, line 43, change "6" to --7--.
Col. 4, line 43, change "18" to --20--.
Col. 5, line 51, after "if" and before "a", delete ",".
Col. 8, line 23, change ":" to --.--.
Col. 9, line 11, after "unit", insert therein --418--.

Signed and Sealed this

Seventeenth Day of August, 1999

Attest:

Q. TODD DICKINSON

Attesting Officer

Acting Commissioner of Patents and Trademarks